United States Patent
Stephenson et al.

(10) Patent No.: US 12,306,064 B2
(45) Date of Patent: May 20, 2025

(54) ENGINE CONDITION AND CONTROL THROUGH THE USE OF A PUMP AS A DYNAMOMETER

(71) Applicant: Halliburton Energy Services, Inc., Houston, TX (US)

(72) Inventors: Stanley Vernon Stephenson, Duncan, OK (US); Timothy Holiman Hunter, Duncan, OK (US); Billy D. Coskrey, Duncan, OK (US); David Rand Hill, Duncan, OK (US); Andrew Silas Clyburn, Duncan, OK (US); Corey Gene Ralls, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 594 days.

(21) Appl. No.: 17/376,445

(22) Filed: Jul. 15, 2021

(65) Prior Publication Data
US 2023/0012856 A1  Jan. 19, 2023

(51) Int. Cl.
G01M 15/02 (2006.01)

(52) U.S. Cl.
CPC .................. *G01M 15/02* (2013.01)

(58) Field of Classification Search
CPC ......... G01M 15/02; F04B 51/00; F04B 47/00; F04D 15/02; F04D 15/0083; F04D 15/0088
See application file for complete search history.

(56) References Cited

U.S. PATENT DOCUMENTS

| | | | | |
|---|---|---|---|---|
| 3,050,993 | A * | 8/1962 | Draughon | G01L 3/1485 60/431 |
| 3,942,363 | A * | 3/1976 | Swis | G01M 15/044 73/116.05 |
| 8,590,614 | B2 | 11/2013 | Surjaatmadja et al. | |
| 8,620,516 | B2 * | 12/2013 | Anilovich | G01M 15/048 701/34.4 |
| 8,834,012 | B2 | 9/2014 | Case et al. | |
| 10,573,159 | B2 | 2/2020 | Neal, III et al. | |
| 10,584,698 | B2 | 3/2020 | Haddad et al. | |
| 10,655,435 | B2 | 5/2020 | Oehring et al. | |
| 10,837,376 | B2 * | 11/2020 | Pathan | F02D 41/28 |
| 10,954,770 | B1 * | 3/2021 | Yeung | E21B 47/008 |

(Continued)

*Primary Examiner* — Catherine T. Rastovski
*Assistant Examiner* — Sharad Timilsina
(74) *Attorney, Agent, or Firm* — Conley Rose, P.C.; Rodney B. Carroll (57) ABSTRACT

The disclosure provides for a wellbore servicing system that comprises an engine operable to provide power to one or more pumps. The one or more pumps are operable to direct a fluid into a wellbore, wherein the engine is coupled to the one or more pumps via a transmission. The system further comprises an engine control module (ECM) coupled to the engine. The system further comprises a controller coupled to the one or more pumps and operable to determine the volumetric efficiency of each of the one or more pumps. The system further comprises an information handling system, wherein the ECM and the controller are communicatively coupled to the information handling system, wherein the information handling system is operable to determine a divergence when a load is placed on the engine and a pumping plan for the system.

24 Claims, 5 Drawing Sheets

(56) References Cited

U.S. PATENT DOCUMENTS

| | | | |
|---|---|---|---|
| 2012/0166096 A1* | 6/2012 | Stephenson | G07C 5/008 700/275 |
| 2016/0195082 A1* | 7/2016 | Wiegman | F04B 23/04 417/63 |
| 2017/0002644 A1* | 1/2017 | Chen | E21B 49/08 |
| 2017/0067334 A1* | 3/2017 | Fripp | E21B 47/008 |
| 2018/0189702 A1* | 7/2018 | Hunter | G06F 30/20 |
| 2019/0211770 A1 | 7/2019 | Weightman et al. | |
| 2020/0370988 A1 | 11/2020 | Rogers et al. | |
| 2021/0040830 A1 | 2/2021 | Mu et al. | |

* cited by examiner

ENGINE CONDITION AND CONTROL THROUGH THE USE OF A PUMP AS A DYNAMOMETER

TECHNICAL FIELD OF THE INVENTION

The present disclosure relates generally to well operations and, more particularly, to systems and methods for utilizing a pump as a dynamometer to monitor engine conditions.

BACKGROUND

The performance of an engine on a frac pumping unit can degrade until it can no longer perform its required duties, operate at desired efficiency, or operate at the detriment of powertrain life. There is currently not a means of measuring the performance of all engines on frac pumping units in real-time to control optimizing the performance of an entire frac spread.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments described below with respect to one implementation are not intended to be limiting.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

Figure 1:
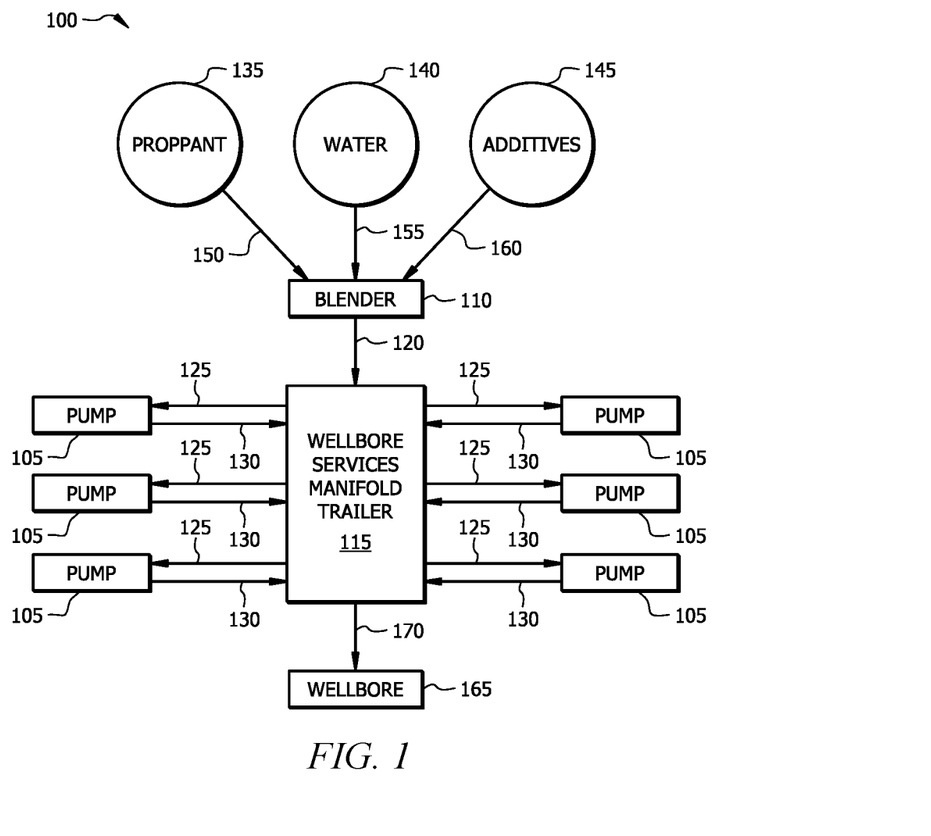
FIG. 1 is a diagram illustrating an example wellbore servicing system, according to aspects of the present disclosure.

The present disclosure provides for systems and methods for using a pump as a dynamometer to monitor performance of an engine. FIG. 1 illustrates an example wellbore servicing system 100. It will be appreciated that the wellbore servicing system 100 disclosed herein can be used for any purpose. In an embodiment, the wellbore servicing system 100 may be used to service a wellbore that penetrates a subterranean formation by pumping a wellbore servicing fluid into the wellbore and/or subterranean formation. As used herein, a "servicing fluid" refers to a fluid used to drill, complete, work over, fracture, repair, or in any way prepare a wellbore for the recovery of materials residing in a subterranean formation penetrated by the wellbore. It is to be understood that "subterranean formation" encompasses both areas below exposed earth and areas below earth covered by water such as ocean or fresh water. Examples of servicing fluids include, but are not limited to, cement slurries, drilling fluids or muds, spacer fluids, fracturing fluids or completion fluids, and gravel pack fluids, etc.

In an embodiment, the wellbore servicing system 100 comprises one or more pumps 105 operable to perform oilfield and/or well servicing operations. Such operations may include, but are not limited to, drilling operations, fracturing operations, perforating operations, fluid loss operations, primary cementing operations, secondary or remedial cementing operations, or any combination of operations thereof. Although a wellbore servicing system is illustrated, those skilled in the art will readily appreciate that the pump 105 disclosed herein may be employed in any suitable operation.

In an embodiment, the wellbore servicing system 100 may be a system such as a fracturing spread for fracturing wells in a hydrocarbon-containing reservoir. In fracturing operations, wellbore servicing fluids, such as particle-laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 100 may comprise a blender 110 that is coupled to a wellbore services manifold trailer 115 via flowline 120. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 115 is coupled to six positive displacement pumps (e.g., such as pump 105) via outlet flowlines 125 and inlet flowlines 130. In alternative embodiments, however, there may be more or less pumps used in a wellbore servicing operation. Outlet flowlines 125 are outlet lines from the wellbore services manifold trailer 115 that supply fluid to the pumps 105. Inlet flowlines 130 are inlet lines from the pumps 105 that supply fluid to the wellbore services manifold trailer 115.

The blender 110 mixes solid and fluid components to achieve a well-blended wellbore servicing fluid. As depicted, proppant 135, water 140, and additives 145 are fed into the blender 110 via feedlines 150, 155, and 160, respectively. The water 140 may be potable, non-potable, untreated, partially treated, or treated water. In an embodiment, the water 140 may be produced water that has been extracted from the wellbore while producing hydrocarbons from the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In an embodiment, the water 140 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 140 may further comprise local surface water contained in natural and/or manmade water features (such as ditches, ponds, rivers, lakes, oceans, etc.). Still further, the water 140 may comprise water stored in local or remote containers. The water 140 may be water that originated from near the wellbore and/or may be water that has been transported to an area near the wellbore from any distance. In some embodiments, the water 140 may comprise any combination of produced water, flowback water, local surface water, and/or container stored water. In some implementations, water may be substituted by nitrogen or carbon dioxide; some in a foaming condition.

In an embodiment, the additives 145 are dry blended and dry fed into the blender 110. In alternative embodiments, however, additives may be pre-blended with water using other suitable blenders, to form a liquid gel concentrate that may be fed into the blender 110. The mixing conditions of the blender 110, including time period, agitation method, pressure, and temperature of the blender 110, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 115.

In an embodiment, the pumps 105 pressurize the wellbore servicing fluid to a pressure suitable for delivery into a wellbore 165 or wellhead. For example, the pumps 105 may increase the pressure of the wellbore servicing fluid to a pressure of up to about 20,000 psi, or about 30,000 psi, or higher. From the pumps 105, the wellbore servicing fluid may reenter the wellbore services manifold trailer 115 via inlet flowlines 130 and be combined so that the wellbore servicing fluid may have a total fluid flow rate that exits from the wellbore services manifold trailer 115 through flowline 170 to the wellbore 165 of between about 1 BPM to about 100 BPM, alternatively from between about 50 BPM to about 150 BPM, alternatively about 100 BPM. Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore (e.g., wellbore 165). Without limitation, servicing the wellbore may include: positioning the wellbore servicing composition in the wellbore (e.g., via one or more pumps 105 as described herein) to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In another embodiment, the wellbore servicing systems and methods may be employed in well completion operations such as primary and secondary cementing operation to isolate the subterranean formation from a different portion of the wellbore.

In an embodiment, a wellbore servicing method may comprise transporting a positive displacement pump (e.g., pump 105) to a site for performing a servicing operation. Additionally, or alternatively, one or more pumps may be situated on a suitable structural support. Non-limiting examples of a suitable structural support or supports include a trailer, truck, skid, barge or combinations thereof. In an embodiment, a motor or other power source for a pump may be situated on a common structural support.

In an embodiment, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid may be prepared on-site (e.g., via the operation of one or more blenders) or, alternatively, transported to the site of the servicing operation.

In an embodiment, a wellbore servicing method may comprise fluidly coupling a pump 105 to the wellbore servicing fluid source. As such, wellbore servicing fluid may be drawn into and emitted from the pump 105. Additionally, or alternatively, a portion of a wellbore servicing fluid placed in a wellbore 165 may be recycled, i.e., mixed with the water stream obtained from a water source and treated in fluid treatment system. Furthermore, a wellbore servicing method may comprise conveying the wellbore servicing fluid from its source to the wellbore 165 via the operation of the pump 105 disclosed herein.

In an alternative embodiment, the reciprocating apparatus may comprise a compressor. In an embodiment, a compressor similar to the pump 105 may comprise at least one each of a cylinder, plunger, connecting rod, crankshaft, and housing, and may be coupled to a motor. In an embodiment, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In an embodiment, a reciprocating apparatus comprises an internal combustion engine, hereinafter referred to as an engine. Such engines are also well known, and typically include at least one each of a plunger, cylinder, connecting rod, and crankshaft. The arrangement of these components is substantially the same in an engine and a pump (e.g. pump 105). A reciprocating element such as a plunger may be similarly arranged to move in reciprocating fashion within the cylinder. Those skilled in the art will appreciate that operation of an engine may somewhat differ from that of a pump. In a pump, rotational power is generally applied to a crankshaft acting on the plunger via the connecting rod, whereas in an engine, rotational power generally results from a force (e.g., an internal combustion) exerted on or against the plunger, which acts against the crankshaft via the connecting rod.

For example, in a typical 4-stroke engine, arbitrarily beginning with the exhaust stroke, the plunger is fully extended during the exhaust stroke, (e.g., minimizing the internal volume of the cylinder). The plunger may then be retracted by inertia or other forces of the engine componentry during the intake stroke. As the plunger retracts within the cylinder, the internal volume of cylinder increases, creating a low pressure within the cylinder into which an air/fuel mixture is drawn. When the plunger is fully retracted within the cylinder, the intake stroke is complete, and the cylinder is substantially filled with the air/fuel mixture. As the crankshaft continues to rotate, the plunger may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. In a diesel engine, however, the spark plug may be omitted, as the heat of compression derived from the high compression ratios associated with diesel engines suffices to provide spontaneous combustion of the air-fuel mixture. In either case, the heat and pressure act forcibly against the plunger and cause it to retract back into the cylinder during the power cycle at a substantial force, which may then be exerted on the connecting rod, and thereby on to the crankshaft.

Figure 2:
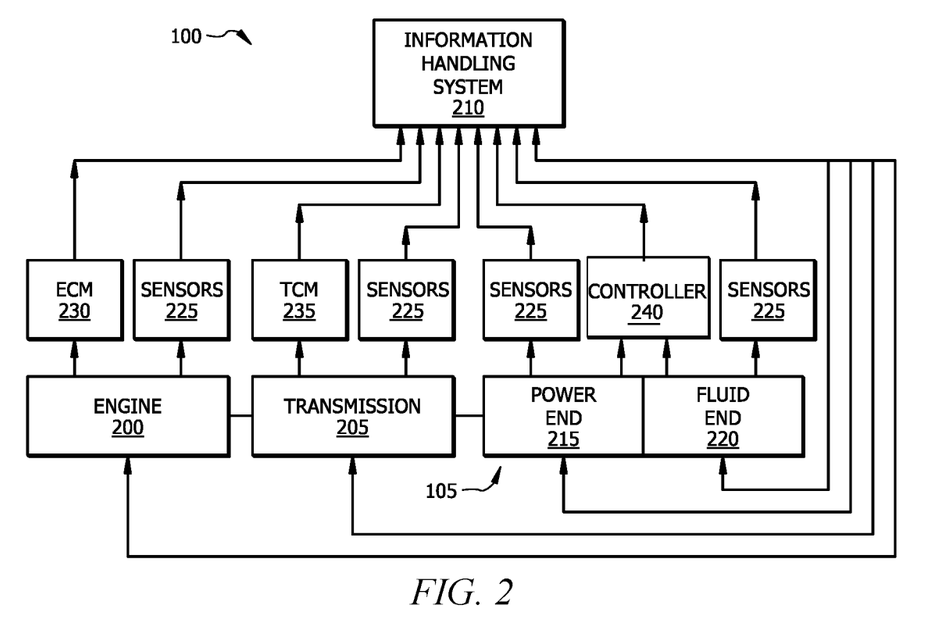
FIG. 2 illustrates further components of the example wellbore servicing system of FIG. 1, according to aspects of the present disclosure.

FIG. 2 illustrates further components of the example wellbore servicing system 100, according to aspects of the present disclosure. As illustrated, the wellbore servicing system 100 may comprise an engine 200, a transmission 205, one or more pumps 105, and an information handling system 210. In one or more embodiments, the engine 200 and transmission 205 may be disposed on the wellbore services manifold trailer 115 (referring to FIG. 1). Any one or more components of the engine 200 may be located on the wellbore services manifold trailer 115, a truck, a trailer, a barrel, a tank, a skid, a vessel, a railcar, any other vehicle or any other suitable location. Without limitations, the engine 200 may comprise an electric, diesel, gas (for example, natural gas), gasoline, wind, water, steam or any other suitable engine, motor or turbines for providing power to the one or more pumps 105. The type of engine 200 may depend on one or more factors including, but not limited to, any one or more of the efficiency of the engine 200, the required speed, torque level, power capacity, and pressure required by the one or more pumps 105, weight, size or power density of engine 200, cost of engine 200, fuel type, fuel efficiency, temperature, sound emissions, exhaust emissions, or any other parameters.

Power from the engine 200 may be transferred to or used to drive one or more one or more pumps 105 via the transmission 205. A drive shaft from engine 200 may couple to transmission 205, and the transmission 205 may further couple to one or more pumps 105. In one or more embodiments, the transmission 205 is not necessary and one or more engines 200 may couple to one or more pumps 105. As illustrated, each pump 105 may comprise a power end 215 and a fluid end 220. The power end 215 may be a portion of the pump 105 that attaches to a power source (for example, the engine 200) and does not interact with fluids. The fluid end 220 may be a portion of the pump 105 operable to displace one or more fluids. The power end 215 and the fluid end 220 may be coupled or otherwise connected together. For example, the power end 215 may be coupled to the fluid end 220 by a plurality of fasteners.

As shown, the wellbore servicing system 100 may include a plurality of sensors 225, an engine control module (ECM) 230, a transmission control module (TCM) 235, and a controller 240. The plurality of sensors 225 may be operable to monitor any one of the engine 200, the transmission 205, the one or more pumps 105, and any combinations thereof. As shown, the plurality of sensors 225 may be communicatively coupled to the engine 200, the transmission 205, and the one or more pumps 105. The plurality of sensors 225 communicatively coupled to the engine 200 may be communicatively coupled with the ECM 230. Each of the plurality of sensors 225 communicatively coupled to the engine 200 may provide engine sensor data to the ECM 230 via hardwiring or wirelessly. For wireless transmission of data, each sensor 225 communicatively coupled to the engine 200 can include a corresponding transceiver (not shown) to transmit the engine sensor data to the ECM 230.

The ECM 230 can be a device including a processor, a memory, and a transceiver. The processor can receive the engine sensor data via the transceiver. The received engine sensor data can be from one or more of the plurality of sensors 225 communicatively coupled to the engine 200. The processor can compare each of the received engine sensor data with one or more corresponding ranges. The ranges can be a normal operating range and/or one or more abnormal operating ranges which are stored in the memory. For example, the abnormal operating ranges can be a warning range, an alarm range and a shutdown range. Based on the comparison, the processor can cause the transceiver to transmit the received engine sensor data and/or one or more engine codes, such as a diagnostic trouble code or codes, when the received engine sensor data falls outside of the normal operating range or that falls within an abnormal operating range. For example, if the received sensor data is for the engine oil pressure, the ECM 230 would compare the received engine oil pressure with one or more operating ranges corresponding to engine oil pressure. The one or more operating ranges can include a normal range which can be from about 35-45 pounds, a warning range which can be from about 30-34 pounds, an alarm range which can be from about 20-29 pounds and a shutdown range which can be from about 0-29 pounds. Alternatively, if the received engine sensor data falls within the normal operating range, then no transmission is sent.

The plurality of sensors 225 communicatively coupled to the transmission 205 may be communicatively coupled with the TCM 235. Each of the plurality of sensors 225 communicatively coupled to the transmission 205 may provide transmission sensor data to the TCM 235 via hardwiring or wirelessly. For wireless transmission of data, each one of the plurality of sensors 225 communicatively coupled to the transmission 205 may include a corresponding transceiver (not shown) to transmit the sensor data to the TCM 235. Similar to the ECM 230, the TCM 235 may include a processor, a memory, and a transceiver. The processor can receive the transmission sensor data via the transceiver. The received transmission sensor data can be from one or more of the plurality of sensors 225 communicatively coupled to the transmission 205. The processor can compare each of the received transmission sensor data with one or more corresponding ranges. The ranges can be a normal operating range and/or one or more abnormal operating ranges which are stored in the memory 318. For example, the abnormal operating ranges can be a warning range, an alarm range and a shutdown range. Based on the comparison, the processor can cause the transceiver to transmit the received transmission sensor data and/or one or more transmission codes, such as a diagnostic trouble code or codes, when the received transmission sensor data falls outside of the normal operating range or that falls within an abnormal operating range. For example, if the received sensor data is for the transmission oil temperature, the TCM 235 may compare the received transmission oil temperature with one or more operating ranges corresponding to transmission oil temperature. The one or more operating ranges can include a normal range which can be from about 175-190 degrees Fahrenheit (F), a first warning range which can be from about 165-174 degrees F., a second warning range which can be from about 191-200 degrees F., a first alarm range which can be from about 0-164 degrees F., and a second alarm range which can be from about 201-210 degrees F. Alternatively, if the received transmission sensor data is in the normal operating range, then no transmission is sent. For values that fall within the shutdown range, the TCM 235 may send a shutdown command. The shutdown command can shut down the engine 200.

The plurality of sensors 225 communicatively coupled to the one or more pumps 105 may be communicatively coupled with the controller 240. Each of the plurality of sensors 225 communicatively coupled to the one or more pumps 105 may provide pump sensor data to the controller 240 via hardwiring or wirelessly. For wireless transmission of data, each one of the plurality of sensors 225 communicatively coupled to the one or more pumps 105 may include a corresponding transceiver (not shown) to transmit the sensor data to the controller 240. Similar to the ECM 230 and TCM 235, the controller 240 may include a processor, a memory, and a transceiver operable to receive sensor data; determine one or more operating parameters of the power end 215 and/or the fluid end 220 of each pump 105; and transmit sensor data and the determined operating parameters to the information handling system 210. The controller 240 may be operable to determine the volumetric efficiency or percent fill of each cylinder of each pump 105 or the volumetric efficiency of the pump 105. The plurality of sensors 225 may include those necessary for feedback to adequately control the operation of the one or more pumps 105 as a whole or added sensors that provide additional information (such as temperatures, pressures, speeds, flowrates, etc.) relative to the health or operation of the major components of the pump 105.

The information handling system 210 may be communicatively coupled with the ECM 230, the TCM 235, and the controller 240. In some embodiments, the operations of the wellbore servicing system 100 are controlled, coordinated, and monitored by the information handling system 210. The information handling system 210 may utilize sensor data as well as operating parameters from the engine 200, transmission 205, and one or more pumps 105 for operations of the wellbore servicing system 100. The information handling system 210 may also be used to monitor equipment health and status. The information handling system 210 may be operable to process the received data, e.g., the engine sensor data and/or the transmission sensor data, and/or one or more diagnostic trouble codes and/or the pump sensor data. For example, the information handling system 210 can compare each of the received diagnostic trouble codes with one or more lists of diagnostic trouble codes or codes stored in memory (for example, memory 310 of FIG. 3) of the information handling system 210. When the received sensor data includes one or more diagnostic trouble codes which match one or more of codes in the one or more lists of diagnostic trouble codes, the information handling system 210 can cause each of the diagnostic trouble codes, along with a description or explanation, to be displayed via a graphical user interface (GUI) on a display. For example, the information handling system 210 can display the engine information and transmission information as shown in FIG. 4A-6C.

In one or more embodiments, the information handling system 210 may be disposed about any suitable location in the wellbore servicing system 100. In alternate embodiments, information handling system 210 may be located remotely from the wellbore servicing system 100. The information handling system 210 may be directly or indirectly coupled to any one or more components of the wellbore servicing system 100.

Figure 3:
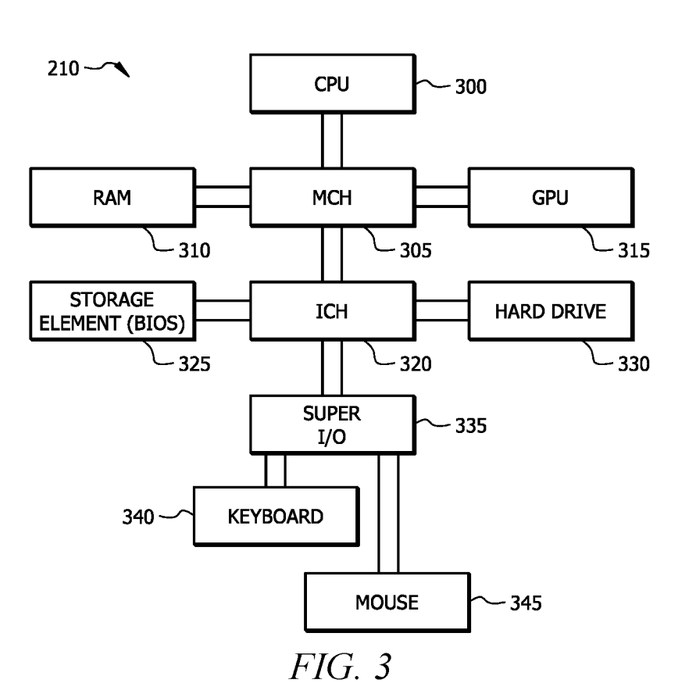
FIG. 3 is a diagram illustrating an example information handling system, according to aspects of the present disclosure.

FIG. 3 is a diagram illustrating an example information handling system 210, according to aspects of the present disclosure. A processor or central processing unit (CPU) 300 of the information handling system 210 is communicatively coupled to a memory controller hub or north bridge 305. The processor 300 may include, for example a microprocessor, microcontroller, digital signal processor (DSP), application specific integrated circuit (ASIC), or any other digital or analog circuitry configured to interpret and/or execute program instructions and/or process data. Processor 300 may be configured to interpret and/or execute program instructions or other data retrieved and stored in any memory such as memory 310 or hard drive 330. Program instructions or other data may constitute portions of a software or application for carrying out one or more methods described herein. Memory 310 may include read-only memory (ROM), random access memory (RAM), solid state memory, or disk-based memory. Each memory module may include any system, device or apparatus configured to retain program instructions and/or data for a period of time (e.g., computer-readable non-transitory media). For example, instructions from a software or application may be retrieved and stored in memory 310 for execution by processor 300.

Modifications, additions, or omissions may be made to FIG. 3 without departing from the scope of the present disclosure. For example, FIG. 3 shows a particular configuration of components of information handling system 210. However, any suitable configurations of components may be used. For example, components of information handling system 210 may be implemented either as physical or logical components. Furthermore, in some embodiments, functionality associated with components of information handling system 210 may be implemented in special purpose circuits or components. In other embodiments, functionality associated with components of information handling system 210 may be implemented in configurable general-purpose circuit or components. For example, components of information handling system 210 may be implemented by configured computer program instructions.

Memory controller hub (MCH) 305 may include a memory controller for directing information to or from various system memory components within the information handling system 210, such as memory 310, storage element 325, and hard drive 330. The memory controller hub 305 may be coupled to memory 310 and a graphics processing unit (GPU) 315. Memory controller hub 305 may also be coupled to an I/O controller hub (ICH) or south bridge 320. I/O controller hub 320 is coupled to storage elements of the information handling system 210, including a storage element 325, which may comprise a flash ROM that includes a basic input/output system (BIOS) of the computer system. I/O controller hub 320 is also coupled to the hard drive 330 of the information handling system 210. I/O controller hub 320 may also be coupled to a Super I/O chip 335, which is itself coupled to several of the I/O ports of the computer system, including keyboard 340 and mouse 345.

In certain embodiments, the information handling system 210 may comprise at least a processor and a memory device coupled to the processor that contains a set of instructions that when executed cause the processor to perform certain actions. In any embodiment, the information handling system 210 may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system 210 may include random access memory (RAM), one or more processing resources such as a central processing unit (CPU) or hardware or software control logic, read only memory (ROM), and/or other types of nonvolatile memory. Additional components of the information handling system 210 may include one or more disk drives, one or more network ports for communication with external devices as well as various input and output (I/O) devices, such as a keyboard, a mouse, and a video display. The information handling system 210 may also include one or more buses operable to transmit communications between the various hardware components.

The present disclosure provides using the one or more pumps 105 as dynamometers to determine the power delivery from the engine 200 and compare output of engine 200 with output of the one or more pumps 105 to determine an engine condition (for example, a parameter for the engine 200). To accurately determine actual discharge rate of the one or more pumps 105 driven by the engine 200, monitoring via the information handling system 210 may be used to improve the accuracy of the one or more pumps 105 to serve as a dynamometer by adjusting for volumetric efficiency changes in the one or more pumps 105 during operation. Fueling for engine 200 monitored by the ECM 230 may be used to determine the fuel rate required to deliver a given hydraulic horsepower (HHP). In other embodiments, a volume of fuel consumed over a given time period could be compared to the work delivered over the same time by the one or more pumps 105. Increases in fuel rate to deliver a given HHP may indicate that an engine condition is deteriorating. Once this method is used to identify when performance by the engine 200 is degrading, other sensors 225 may be used to determine engine degradation causes. Without limitations, such causes may include plugged or collapsed air filters, plugged or collapsed fuel filters, plugged or collapsed oil filters, faulty injectors, worn bearings, worn piston rings/scored cylinders, auxiliary component failures including a fan and/or fan belt, pump problems, and miscellaneous causes, and any combinations thereof. By using the plurality of sensors 225, the causes of degradation of a response by the engine 200 may also be related to other components, such as the pump 105.

In one or more embodiments, the information handling system 210 may be operable to determine the volumetric efficiency of the one or more pumps 105 to allow for automatic adjustment of HHP delivered as the volumetric efficiency changes without adding additional components, such as a discharge flowmeter, to each pump 105. This may allow the pumps 105 to effectively operate as a dynamometer. By modeling the one or more pumps 105 as a dynamometer, the information handling system 210 may be operable to determine that as load on the engine 200 increases when horsepower is constant that there may be an increase in internal loading due to some internal engine condition. In embodiments, the information handling system 210 may be operable to determine a divergence when a load is placed on engine 200 between a modeled operation of engine 200 and real-time operation of engine 200. In one or more embodiments, adjustment of the volumetric efficiency may allow for an accurate measurement of the flowrate from the pump 105. Combining this information with the pressure being pumped may provide for an accurate measure of HHP.

The modeled conditions used by the information handling system 210 may be initial conditions such as the determinations for hydraulic horsepower or engine brake horsepower (BHP). In embodiments, the determination for BHP may be (HHP)/(mechanical efficiency of transmission×mechanical efficiency of pump). The determinations for HHP and BHP may be compared to real-time conditions such as engine % load that may be provided by the ECM 230. The BHP of engine 200 may also be calculated from the torque and rpm of the engine 200 with the addition of a physical or virtual (model-based) torque meter.

For example, the information operating system 210 may compare the model versus the real-time conditions of engine 200 and identify when there is divergence between the two. When there is divergence, such as an increase in % engine load when the modeled HHP and/or BHP remains constant, then there may be an increase in internal load in the engine 200, transmission 205, or one or more pumps 105. This internal load may also be equated to a decrease in mechanical efficiency in one of the engine 200, transmission 205, or one or more pumps 105. For the engine 200, a sudden change in oil pressure due to a spun bearing is one condition to relate to the increase of load or decrease in mechanical efficiency to the engine 200. When the information operating system 210 identifies an issue or condition with engine 200, the information operating system 210 may also identify if it is a critical or minor condition. For critical conditions, immediate action may be required as there is risk of throwing a connection rod through the block of engine 200, starting a fire, or other devasting response. For these examples, information handling system 210 may instruct operation of engine 200 to terminate. For minor conditions that won't cause immediate catastrophic failure, the action may be to derate the engine 200.

On the transmission 205 and power end 215 of pump 105, the failure may not occur as fast as that which would occur with the engine 200. For example, on both of the transmission 205 and power end 215 of pump 105, a temperature rise may occur as there is a divergence between the % engine load and HHP or BHP. The rate of temperature rise may determine whether this is a critical or minor issue/condition for the transmission 205 and power end 215 of pump 105. Instead of % engine load, diesel flowrate to the engine 200 may also be used if the engine 200 is running on diesel alone. In embodiments wherein engine 200 is a dual-fuel engine, then diesel flowrate from the ECM 230 may be used if the gas substitution is zero.

In embodiments, the information handling system 210 may output the degradation and/or severity of the engine condition determined by the divergence between the model and real-time conditions and other conditions related to sensor data from the engine 200, transmission 205, and one or more pumps 105 that define which one may require replacing/maintenance and how critical it is to change now or is the issue minor enough to delay response. The information handling system 210 may output and display such information and determinations in graphical form to a user or operator. The information handling system 210 may operate iteratively in a feedback loop to adjust determination and comparisons between the model and real-time conditions of engine 200. When divergences are identified, both past data and current data may be related to the engine conditions that result in a specific failure (for example, spun bearing).

The information handling system 210 may further provide an initial pumping plan based on the original job design. However, based on real-time feedback of component degradation and severity of any one of the engine 200, transmission 205, and one or more pumps 105, the pumping plan may include a change in engine speed, transmission gear, or any other controllable parameter. In the critical scenarios (identified above), a request may be transmitted to terminate operation of the engine 200, switch the transmission 205 to neutral, or any number of controllable changes that may minimize the damage risk to people, equipment, the environment, the reservoir, the well, or any combination thereof.

The following technical advantages may be realized in view of the present disclosure: no additional sensors are required to be added to the system; early detection of degradation for the engine 200; better control since a pumping unit will not be requested to do something it does not have the power to do (if the engine 200 does not have the required power, the controls are required to request the same from another pumping unit); reduced emission by not using an engine 200 that is not operating at optimal levels; determine unit health as a function of actual performance capabilities, to be used in equipment selection and deployment; and projection of anticipated future maintenance, including indication of usefulness before such needed maintenance. In embodiments, detection of degradation may provide for repairs before major powertrain damage results; lower costs; and an increase in availability of pumping units by performing repairs before major damage, which requires longer times out of service.

In one or more embodiments, the smoothness of the fuel rate may allow for determination of which pumps 105 to alter or take offline to reduce the power end 215, transmission 205, and/or engine 200 from being hammered due to the poor performing pump 105. Another embodiment may include comparing the performance of each engine 200 on the spread via the information handling system 210 to see which ones are outside of the engine tolerance band (for example, +/−3% or 6%).

To facilitate a better understanding of the present disclosure, the following examples of certain aspects of certain embodiments are given. The following examples are not the only examples that could be given according to the present disclosure and are not intended to limit the scope of the disclosure or claims.

Example 1

Figure 4A:
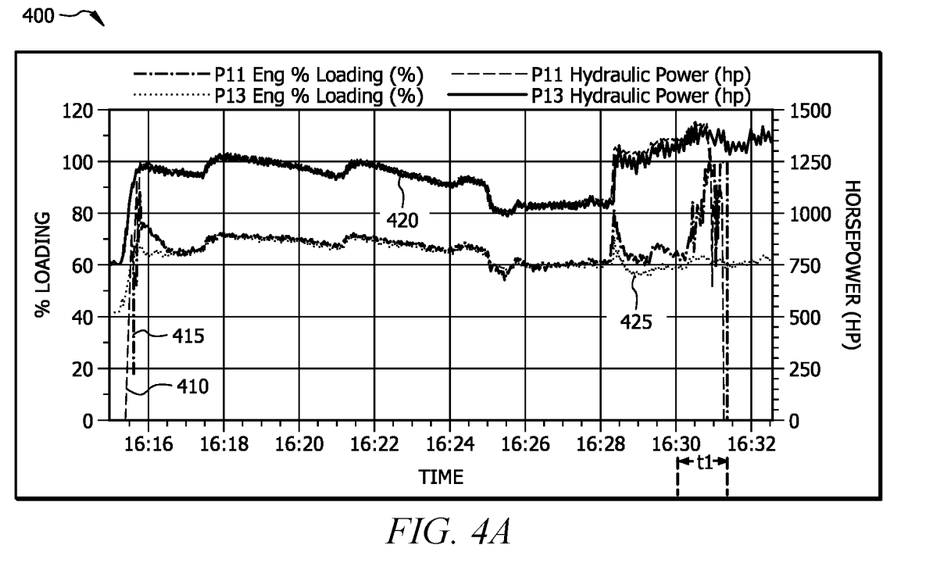
FIGS. 4A and 4B illustrate a graph depicting engine performance, according to aspects of the present disclosure.
Figure 4B:
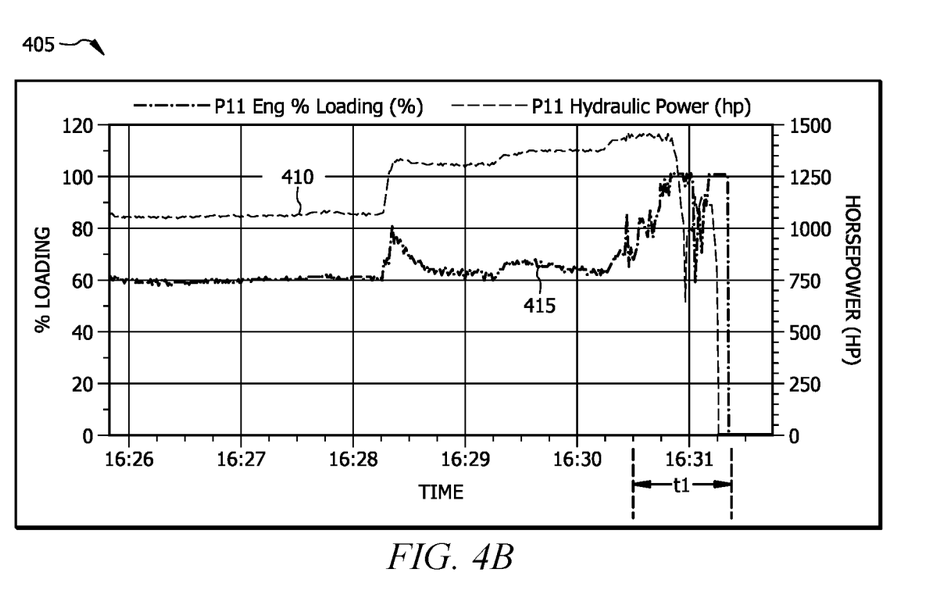

FIGS. 4A and 4B illustrate a graph 400, 405 depicting engine performance, respectively. For both graphs 400, 405, engine performance is monitored as % load and hydraulic horsepower (hp) over time. Graph 400 illustrates a comparison between model and real-time conditions of an engine (for example, engine 200 of FIG. 2) when a critical engine condition occurs (for example, a ventilated engine wherein a rod is thrown). Graph 405 illustrates solely the real-time conditions of the engine and depicts a time period "t1" indicating a warning that the critical engine condition is about to occur. As illustrated, the real-time hydraulic horsepower is depicted as 410, real-time % load is depicted as 415, model hydraulic horsepower is depicted as 420, and the model % load is depicted as 425. In embodiments, the information handling system 210 (referring to FIG. 2) may be monitoring each of 410, 415 through the ECM 230 (referring to FIG. 2), TCM 235 (referring to FIG. 2), and/or the controller 240 (referring to FIG. 2). Information handling system 210 may be operable to identify a divergence between the real-time % load 415 and the model % load 425 of the engine at t1. This may be determined as a divergence as the real-time hydraulic horsepower 410 and the model hydraulic horsepower 420 of the engine remains constant during this time period as the real-time % load 415 is increasing and the model % load 425 is constant. As illustrated, t1 provides for approximately a one-minute warning to a user or operator that there is a critical engine condition. After t1, the real-time % load 415 and hydraulic horsepower 410 decrease to zero, which indicates engine failure. In this example, the engine ventilated at the end of t1.

Example 2

Figure 5:
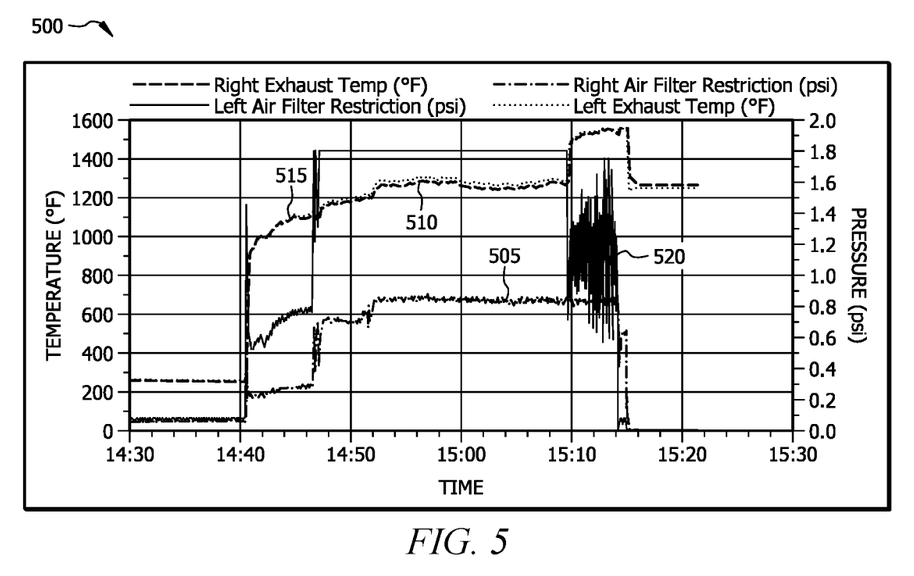
FIG. 5 illustrates a graph depicting engine performance, according to aspects of the present disclosure.

FIG. 5 illustrates a graph 500 depicting engine performance. Within graph 500, engine performance is monitored as temperature and pressure over time. Graph 500 illustrates a comparison between a left air filter and a right air filter of an engine (for example, engine 200 of FIG. 2) when a critical engine condition occurs (for example, a plugged air filter). As illustrated, the right air filter pressure is depicted as 505, right air filter temperature is depicted as 510, left air filter temperature is depicted as 515, and the left air filter pressure is depicted as 520. In embodiments, the information handling system 210 (referring to FIG. 2) may be monitoring each of 505, 510, 515, and 520 through the ECM 230 (referring to FIG. 2), TCM 235 (referring to FIG. 2), and/or the controller 240 (referring to FIG. 2). Information handling system 210 may be operable to identify a critical engine condition where left air filter pressure 520 suddenly decreases and oscillates until the left air filter fails. This condition may be that the left air filter was plugged. This may be indicative as the right air filter temperature 510 and left air filter temperature 515 are approximately the same, but there is a constant difference in pressures of 505 and 520. This may indicate that the right air filter had been replaced and the left air filter was not replaced. A plugged air filter, such as the left air filter, may fail and cause a fire in the engine.

Example 3

Figure 6A:
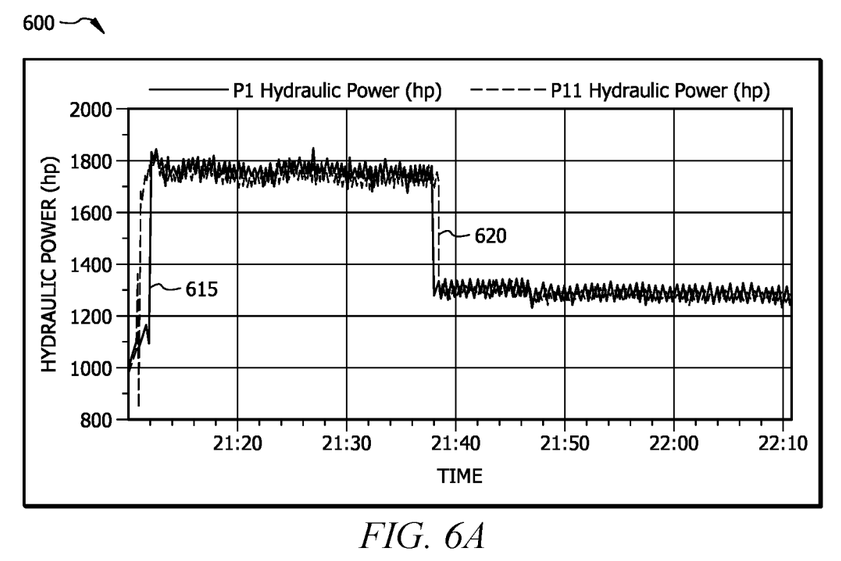
FIGS. 6A, 6B, and 6C illustrate a graph engine performance, according to aspects of the present disclosure.
Figure 6B:
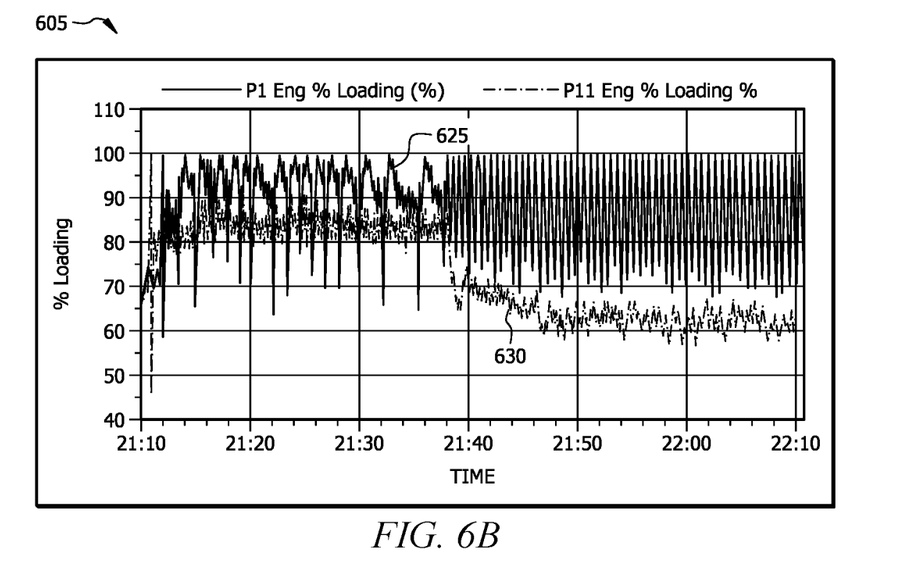
Figure 6C:
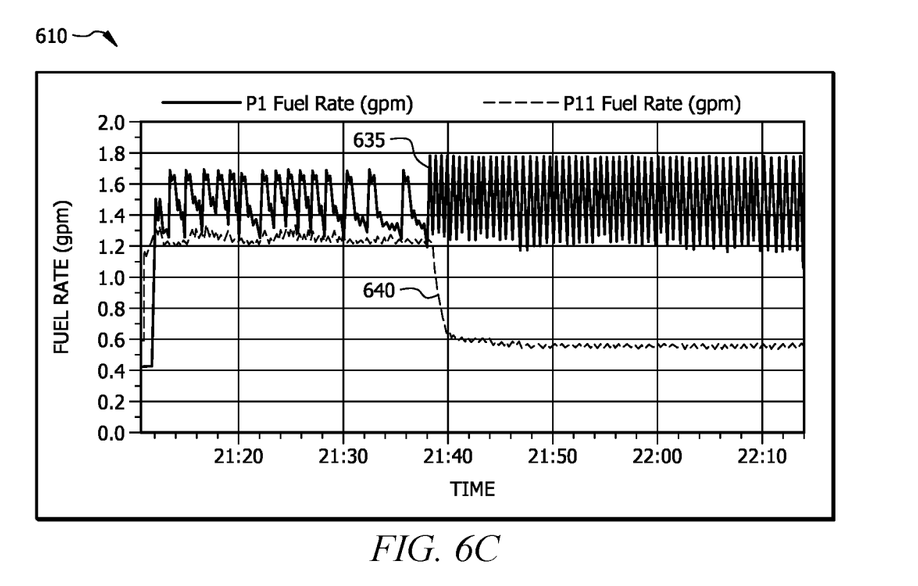

FIGS. 6A, 6B, and 6C illustrate a graph 600, 605, and 610 depicting engine performance, respectively. For graph 600, engine performance is monitored as hydraulic horsepower (hp) over time. For graph 605, engine performance is monitored as % load over time. For graph 610, engine performance is monitored as fuel rate (gpm) over time. Graphs 600, 605, and 610 illustrate a comparison between model and real-time conditions of an engine (for example, engine 200 of FIG. 2) when a critical engine condition occurs (for example, problems with a pump 105). As illustrated, the real-time hydraulic horsepower is depicted as 615, model hydraulic horsepower is depicted as 620, real-time % load is depicted as 625, the model % load is depicted as 630, real-time fuel rate is depicted as 635, and the model fuel rate is depicted as 640. In embodiments, the information handling system 210 (referring to FIG. 2) may be monitoring each of 615, 625, and 635 through the ECM 230 (referring to FIG. 2), TCM 235 (referring to FIG. 2), and/or the controller 240 (referring to FIG. 2). Information handling system 210 may be operable to identify a critical engine condition where the real-time hydraulic horsepower 615 suddenly decreases, but the real-time % load 625 and real-time fuel rate 635 do not decrease accordingly, wherein they oscillates at a higher frequency. This condition may be that the pump coupled to the engine is not operating properly. This may be indicative as there is an increase in the difference between the real-time % load 625 and model % load 630 and between the real-time fuel rate 635 and the model fuel rate 640.

An embodiment of the present disclosure is a wellbore servicing system comprising an engine operable to provide power to one or more pumps; one or more pumps operable to direct a fluid into a wellbore, wherein the engine is coupled to the one or more pumps; an engine control module (ECM) coupled to the engine and operable to perform diagnostics on the engine; a controller coupled to the one or more pumps and operable to determine the volumetric efficiency of each of the one or more pumps; and an information handling system, wherein the ECM and the controller are communicatively coupled to the information handling system, wherein the information handling system is operable to determine a divergence when a load is placed on the engine and a pumping plan for the wellbore servicing system.

In one or more embodiments described in the preceding paragraph, wherein the engine is selected from a group consisting of an engine, motor, turbines, or combinations thereof for providing power to the one or more pumps. In one or more embodiments described above, wherein the engine is configured to produce power from a power source selected from a group consisting of electricity, diesel, natural gas, gasoline, wind, water, or steam. In one or more embodiments described above, further comprising a plurality of sensors communicatively coupled to the ECM and operable to monitor the engine. In one or more embodiments described above, further comprising a transmission coupling the engine to the one or more pumps; a transmission control module (TCM) coupled to the transmission and operable to perform diagnostics on the transmission; and a plurality of sensors communicatively coupled to the TCM and operable to monitor the transmission. In one or more embodiments described above, further comprising a plurality of sensors communicatively coupled to the controller and operable to monitor the one or more pumps. In one or more embodiments described above, wherein the information handling system is further operable to determine an engine condition based, at least in part, on volumetric efficiency of the one or more pumps. In one or more embodiments described above, wherein the engine condition is selected from a group consisting of a plugged air filter, collapsed air filters plugged fuel filter, collapsed fuel filter, plugged oil filter, collapsed oil filter, faulty injectors, worn bearings, spun bearings, worn piston rings, scored cylinders, auxiliary component failures including a fan or fan belt, or pump problems.

Another embodiment of the present disclosure is a method for monitoring an engine through the use of a pump operable to function as a dynamometer, comprising: determining an output of the engine through a plurality of sensors coupled to the engine; transmitting the output of the engine to an information handling system; determining an output of the pump through a plurality of sensors coupled to a power end of the pump and to a fluid end of the pump, wherein determining an output of the pump comprises adjusting for a volumetric efficiency of the pump; transmitting the output of the pump to the information handling system; and determining an engine condition based on the output of the engine and the output of the pump.

In one or more embodiments described in the preceding paragraph, further comprising: determining model conditions for the output of the engine; and comparing the model conditions for the output of the engine to the output of the engine. In one or more embodiments described above, further comprising determining a divergence between the model conditions and the output of the engine, wherein the determined divergence is an indication of an engine condition. In one or more embodiments described above, further comprising identifying a time period prior to the occurrence of the engine condition. In one or more embodiments described above, wherein the engine condition is selected from a group consisting of a plugged air filter, collapsed air filters plugged fuel filter, collapsed fuel filter, plugged oil filter, collapsed oil filter, faulty injectors, worn bearings, spun bearings, worn piston rings, scored cylinders, auxiliary component failures including a fan or fan belt, or pump problems. In one or more embodiments described above, wherein the engine is selected from a group consisting of an engine, motor, turbines, or combinations thereof for providing power to the one or more pumps. In one or more embodiments described above, wherein the engine is configured to produce power from a power source selected from a group consisting of electricity, diesel, natural gas, gasoline, wind, water, or steam.

A further embodiment of the present disclosure is a non-transitory computer readable medium storing one or more instructions that, when executed, cause a processor to: determine an output of the engine through a plurality of sensors coupled to the engine; transmit the output of the engine to an information handling system; determine an output of the pump through a plurality of sensors coupled to a power end of the pump and to a fluid end of the pump, wherein determining an output of the pump comprises adjusting for a volumetric efficiency of the pump; transmit the output of the pump to the information handling system; and determine an engine condition based on the output of the engine and the output of the pump.

In one or more embodiments described in the preceding paragraph, wherein the instructions are further configured to: determine model conditions for the output of the engine; and compare the model conditions for the output of the engine to the output of the engine. In one or more embodiments described above, wherein the instructions are further configured to: determine a divergence between the model conditions and the output of the engine, wherein the determined divergence is an indication of an engine condition. In one or more embodiments described above, wherein the instructions are further configured to: identify a time period prior to the occurrence of the engine condition. In one or more embodiments described above, wherein the engine condition is selected from a group consisting of a plugged air filter, collapsed air filters plugged fuel filter, collapsed fuel filter, plugged oil filter, collapsed oil filter, faulty injectors, worn bearings, spun bearings, worn piston rings, scored cylinders, auxiliary component failures including a fan or fan belt, or pump problems.

Unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A wellbore servicing system, comprising:
   an engine;
   one or more pumps configured to direct a fluid into a wellbore, wherein the one or more pumps are fluidly coupled to the wellbore via a flowline, and wherein the engine is configured to drive the one or more pumps;
   an engine control module (ECM) coupled to the engine and configured to perform diagnostics on the engine;
   a controller coupled to the one or more pumps and configured to determine volumetric efficiency of each of the one or more pumps; and
   an information handling system, wherein the ECM and the controller are communicatively coupled to the information handling system, and wherein the information handling system is configured to determine an engine condition based on a comparison of an output of the engine with an output of the one or more pumps.

2. The wellbore servicing system of claim 1, wherein the engine is selected from a group consisting of an engine, motor, turbines, or combinations thereof.

3. The wellbore servicing system of claim 2, wherein the engine is configured to produce power from a power source selected from a group consisting of electricity, diesel, natural gas, gasoline, wind, water, steam, or combinations thereof.

4. The wellbore servicing system of claim 1, further comprising a plurality of sensors communicatively coupled to the ECM and configured to monitor the engine.

5. The wellbore servicing system of claim 1, further comprising:
a transmission coupling the engine to the one or more pumps;
a transmission control module (TCM) coupled to the transmission and configured to perform diagnostics on the transmission; and
a plurality of sensors communicatively coupled to the TCM and configured to monitor the transmission.

6. The wellbore servicing system of claim 1, further comprising a plurality of sensors communicatively coupled to the controller and configured to monitor the one or more pumps.

7. The wellbore servicing system of claim 1, wherein the information handling system is further configured to determine the engine condition based on the volumetric efficiency.

8. The wellbore servicing system of claim 1, wherein the engine condition is selected from a group consisting of a plugged air filter, collapsed air filters, plugged fuel filter, collapsed fuel filter, plugged oil filter, collapsed oil filter, faulty injectors, worn bearings, spun bearings, worn piston rings, scored cylinders, auxiliary component failures including a fan or fan belt, pump problems, or combinations thereof.

9. A method for monitoring an engine through use of a pump operable to function as a dynamometer, comprising:
determining an output of the engine through a plurality of sensors coupled to the engine;
transmitting the output of the engine to an information handling system;
determining an output of the pump through a plurality of sensors coupled to a power end of the pump and to a fluid end of the pump, wherein the pump is fluidly coupled to a wellbore via a flowline, and wherein the determining of the output of the pump comprises adjusting for a volumetric efficiency of the pump;
transmitting the output of the pump to the information handling system; and
determining an engine condition based on a comparison of the output of the engine with the output of the pump.

10. The method of claim 9, further comprising:
determining model conditions for the output of the engine; and
comparing the model conditions with the output of the engine.

11. The method of claim 10, further comprising determining a divergence between the model conditions and the output of the engine, wherein the determined divergence is an indication of the engine condition.

12. The method of claim 11, further comprising identifying a time period prior to occurrence of the engine condition.

13. The method of claim 11, wherein the engine condition is selected from a group consisting of a plugged air filter, collapsed air filters, plugged fuel filter, collapsed fuel filter, plugged oil filter, collapsed oil filter, faulty injectors, worn bearings, spun bearings, worn piston rings, scored cylinders, auxiliary component failures including a fan or fan belt, pump problems, or combinations thereof.

14. The method of claim 9, wherein the engine is selected from a group consisting of an engine, motor, turbines, or combinations thereof.

15. The method of claim 14, wherein the engine is configured to produce power from a power source selected from a group consisting of electricity, diesel, natural gas, gasoline, wind, water, steam, or combinations thereof.

16. A non-transitory computer readable medium storing one or more instructions that, when executed, cause a processor to:
determine an output of an engine through a plurality of sensors coupled to the engine;
transmit the output of the engine to an information handling system;
determine an output of a pump through a plurality of sensors coupled to a power end of the pump and to a fluid end of the pump, wherein the pump is fluidly coupled to a wellbore via a flowline, and wherein the output of the pump is determined by adjusting for a volumetric efficiency of the pump;
transmit the output of the pump to the information handling system; and
determine an engine condition based on a comparison of the output of the engine with the output of the pump.

17. The non-transitory computer readable medium of claim 16, wherein the instructions, when executed, further cause the processor to:
determine model conditions for the output of the engine; and
compare the model conditions for the output of the engine to the output of the engine.

18. The non-transitory computer readable medium of claim 17, wherein the instructions, when executed, further cause the processor to:
determine a divergence between the model conditions and the output of the engine, wherein the determined divergence is an indication of the engine condition.

19. The non-transitory computer readable medium of claim 18, wherein the instructions, when executed, further cause the processor to:
identify a time period prior to occurrence of the engine condition.

20. The non-transitory computer readable medium of claim 19, wherein the engine condition is selected from a group consisting of a plugged air filter, collapsed air filters, plugged fuel filter, collapsed fuel filter, plugged oil filter, collapsed oil filter, faulty injectors, worn bearings, spun bearings, worn piston rings, scored cylinders, auxiliary component failures including a fan or fan belt, pump problems, or combinations thereof.

21. The wellbore servicing system of claim 1, wherein the one or more pumps are configured to hydraulically fracture the wellbore by pumping the fracturing fluid through the one or more flowlines and into the wellbore.

22. The wellbore servicing system of claim 1, wherein
an outlet of each of the one or more pumps is fluidly coupled to one of the one or more flowlines,
each of the one or more flowline is coupled to a wellbore services manifold trailer,
the wellbore services manifold trailer is fluidly coupled to another flowline, and
the other flowline is fluidly coupled to the wellbore.

23. The wellbore servicing system of claim 1, wherein the output of the one or more pumps comprises a discharge rate of the one or more pumps.

24. The wellbore servicing system of claim 1, wherein the output of the engine comprises horsepower of the engine.

* * * * *